United States Patent [19]

Schneider

[11] Patent Number: 5,419,133

[45] Date of Patent: May 30, 1995

[54] HIGH SPEED THERMOCHEMICAL ACTUATOR

[76] Inventor: Edward T. Schneider, 8729 Hilltop, Mentor, Ohio 44060

[21] Appl. No.: 2,149

[22] Filed: Jan. 11, 1993

Related U.S. Application Data

[63] Continuation-in-part of Ser. No. 682,423, Apr. 8, 1991, Pat. No. 5,177,969, which is a continuation-in-part of Ser. No. 402,616, Sep. 5, 1989, Pat. No. 5,025,627.

[51] Int. Cl.⁶ .................................................. F03G 7/06
[52] U.S. Cl. .......................................... 60/527; 60/528; 60/530; 251/11
[58] Field of Search ............... 60/527, 528, 530, 531, 60/524; 251/11; 137/339; 219/513; 392/346; 126/400; 165/185

[56] References Cited

U.S. PATENT DOCUMENTS

| | | | |
|---|---|---|---|
| 2,215,157 | 9/1940 | Platzner | 60/527 |
| 2,938,384 | 5/1960 | Soreng et al. | 60/527 |
| 2,989,281 | 6/1961 | Fritts | 251/11 |
| 3,193,600 | 7/1965 | Ronzio et al. | 264/102 |
| 3,194,010 | 7/1965 | Lejon | 60/531 |
| 3,376,631 | 4/1968 | Sherwood et al. | 29/405 |
| 3,475,904 | 11/1969 | Hayes | 60/530 |
| 3,823,089 | 7/1974 | Ryan et al. | 252/70 |
| 3,953,973 | 5/1976 | Cheng et al. | 60/671 |
| 4,041,706 | 8/1977 | White | 60/527 |
| 4,075,845 | 2/1978 | Allen | 60/527 |
| 4,081,963 | 4/1978 | Stove | 60/528 |
| 4,253,304 | 3/1981 | Lamb et al. | 60/527 |
| 4,258,899 | 3/1981 | Huelle et al. | 251/11 |
| 4,341,262 | 7/1982 | Alspaugh | 392/346 |
| 4,414,814 | 11/1983 | White | 60/682 |
| 4,442,670 | 4/1984 | Goldman | 60/517 |
| 4,685,651 | 8/1987 | Nouvelle et al. | 60/527 |
| 4,836,496 | 6/1989 | Abujudom et al. | 251/11 |
| 5,177,969 | 1/1993 | Schneider | 60/527 |
| 5,236,779 | 8/1993 | Sheer et al. | 428/323 |

FOREIGN PATENT DOCUMENTS

| | | | |
|---|---|---|---|
| 701621 | 1/1965 | Canada | 60/527 |
| 2095338 | 9/1982 | United Kingdom . | |

*Primary Examiner*—Ira S. Lazarus
*Assistant Examiner*—L. Heyman
*Attorney, Agent, or Firm*—Fay, Sharpe, Beall, Fagan, Minnich & McKee

[57] ABSTRACT

A heat sink (14) provides thermal communication between an actuator (18) and fluid controlled by a valve (12) which is flowing through a conduit (10). The actuator includes a vessel which is defined on its largest surfaces by plates (22, 50) of beryllium oxide thermally conductive ceramic covered with thermally conductive, relatively electrically non-conductive nichrome foil (24, 26). Longitudinal sides (30, 32) of the vessel are also relatively non-conductive. A thermally and electrically conductive core, such as accordion pleated beryllium copper foil (44) or a carbon fiber mat (82, 116) is disposed in the chamber. Electrical current flows through the core itself (FIG. 4) or through electrically insulated heating wires (80) (FIG. 5) or through an electrically insulated heating surface layer (FIG. 6) causing resistance heating and melting of a non-gaseous polymeric phase change compound (46). The resistance heating current is inductively induced in the embodiment of FIG. 8. The polymeric core material expands transferring force through a rubber core (66, 108) to a push pin (68, 130). Fluid flowing through the conduit (10) draws heat from the phase change material through the core, the vessel, and the heat sink to solidify the phase change compound, causing the push pin to be retracted. The phase change compound is selected and the actuator is sized to achieve an actuation time of less than 500 milliseconds.

36 Claims, 6 Drawing Sheets

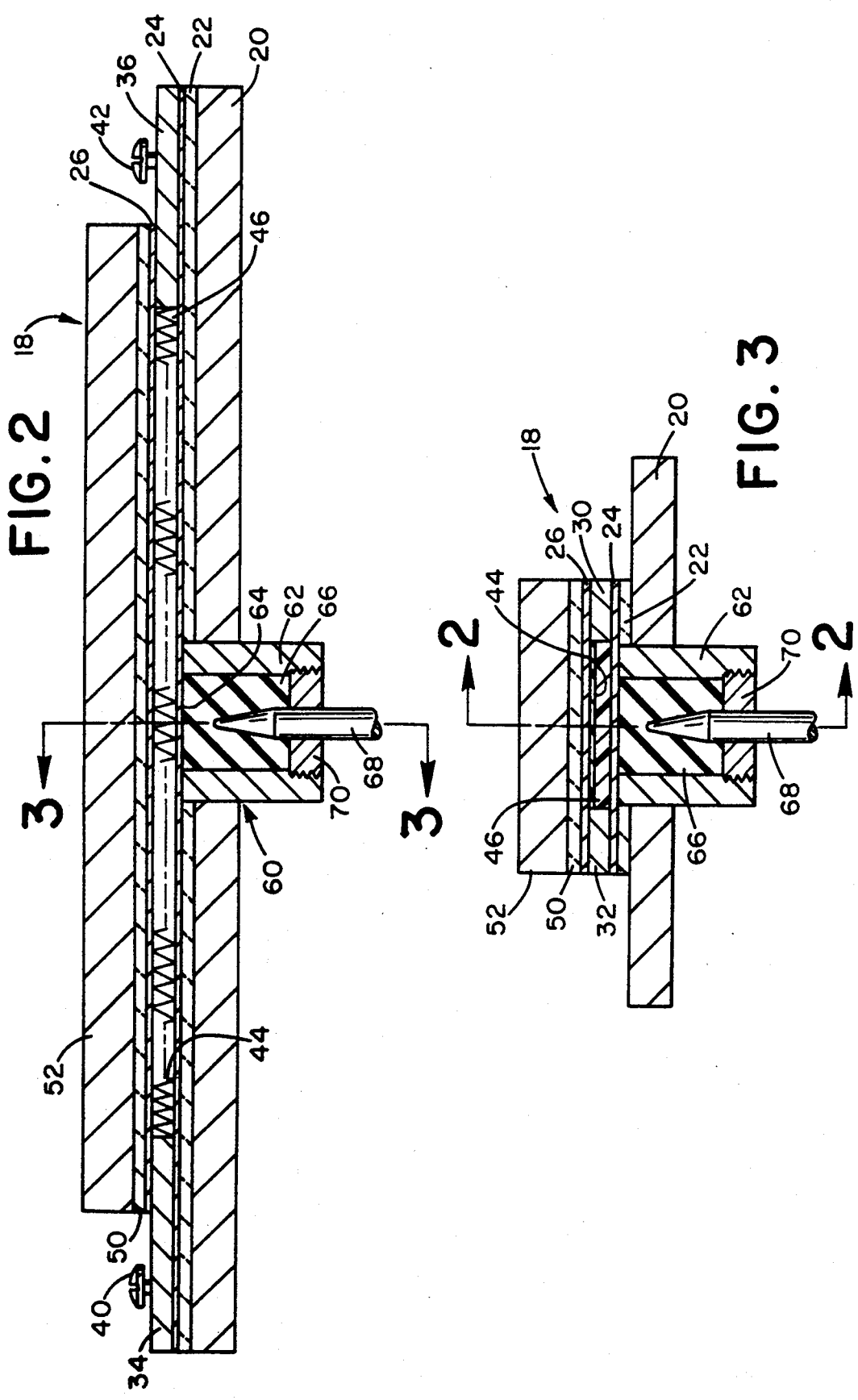

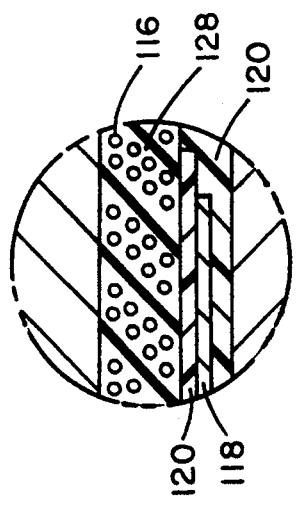
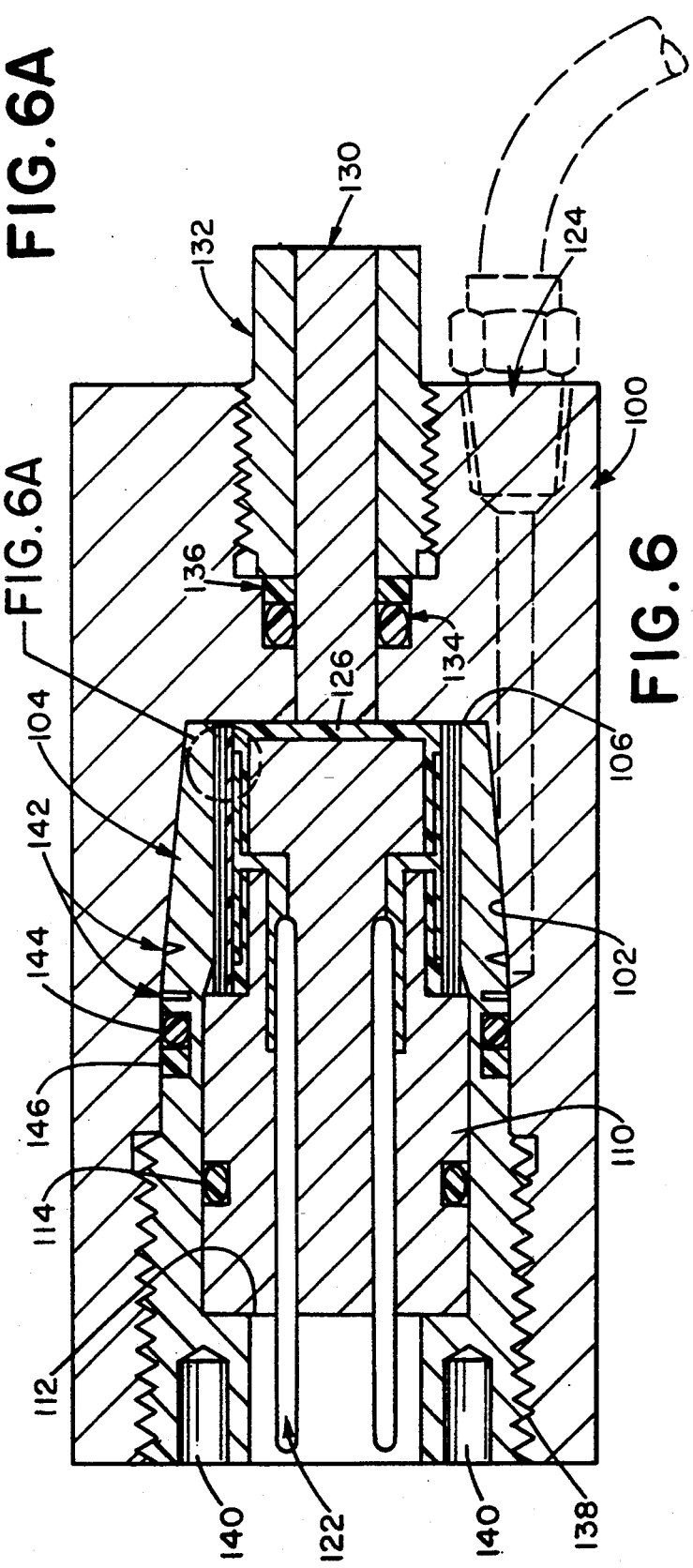
FIG. 6A
FIG. 6

HIGH SPEED THERMOCHEMICAL ACTUATOR

This application is a continuation-in-part of U.S. application Ser. No. 07/682,423, filed Apr. 8, 1991 now U.S. Pat. No. 5,177,969 which is a continuation-in-part of U.S. application Ser. No. 07/402,616, filed Sep. 5, 1989, now U.S. Pat. No. 5,025,627.

BACKGROUND OF THE INVENTION

The present invention relates to mechanical power supplies and actuators. It finds particular application in conjunction with high force, low travel extensible actuators and will be described with particular reference thereto. However, it is to be appreciated that the invention will also find application in conjunction with other high pressure fluid systems, as well as other mechanical power supplies, pumps, motors, valve controllers, and the like.

Heretofore, numerous techniques have been utilized for converting thermal expansion into mechanical power. The large power levels generated by thermal expansion have been converted to useful work in heat engines and other devices. Most commonly, the energy of a liquid/vapor phase thermal expansion is harnessed to capitalize on the ready transportability of liquids. The transportability facilitates a mass transfer of heat for effecting phase change.

One way to effect the mass transfer is by physically moving the liquid to a heat source, then allowing the liquid/vapor to flow against resistance to a cooling source. Steam and other types of external combustion engines typify this technique. In another technique, fuel liquids or liquid aerosols are pumped into a combustion chamber. The mix is ignited and the combustion vapor is permitted to exit the chamber against resistance, physically removing the heat and clearing the chamber for the next cycle. The internal combustion engine typifies this mode. These two modes utilize the well-known capabilities of mass transfer as an efficient method of transporting heat and minimize the need for thermal conduction for moving heat.

These liquid/vapor phase techniques have several drawbacks. First, the vapor phase is compressed at very high pressures. An unanticipated release of these pressures creates shock waves associated with a blast, hurling debris in a dangerous manner. The material is transported and expended, requiring complex controls and valving, as well as a continuous supply of liquid to replace the liquid lost or consumed.

Rather than transporting the material which is acted upon by the heat to expand and contract, the heat itself may be moved. More specifically, heat can be conducted into and out of a sealed chamber which expands during the heating cycle and contracts during the cooling cycle. The sealed chamber technique has many advantages including its mechanical simplicity, proportional control, high stiffness actuation, ready adaption to a variety of heat sources, high power density, and silent operation. Moreover, because liquids compress only a small amount, as compared to vapors, they tend to be much safer than a liquid/vapor system. Unfortunately, the transfer of heat into and out of the medium normally relies on thermal conductivity. Mediums which exhibit good expansion/contraction ratios upon melting have relatively poor thermal conductivities. Thus, a solid/liquid sealed chamber phase change actuator tends to have a very slow cycle time.

The present invention contemplates a new and improved solid/liquid or solid/solid phase change sealed chamber actuator which can exhibit a reduced cycle time on the order of the cycle time of a solenoid, i.e. about one half second or less.

SUMMARY OF THE INVENTION

In accordance with one aspect of the present invention, a housing is provided which defines an internal chamber or vessel. A core material is provided in the chamber, which core material defines narrow paths between its surfaces. The paths are filled with a thermal expansion medium.

In accordance with a more specific aspect of the present invention, a ratio of the surface area of the core material to the volume of thermal expansion material is at least 2,500 $cm^1$.

In accordance with a more limited aspect of the present invention, the thermal conductivity of the core is at least 20 times the thermal conductivity of the thermal expansion material.

In accordance with another aspect of the present invention, the core material includes high thermal conductivity carbon fiber.

In accordance with a more limited aspect of the present invention, the carbon fiber includes one of a random fiber mat or felt, woven cloth, rovings, mandrel windings, chopped, finely divided and added to a polymeric expansion material soup prior to filling the core, or the like.

In accordance with another aspect of the present invention, the core medium includes diamond materials.

In accordance with another aspect of the present invention, the carbon fiber material is prestressed, e.g. compressed. More specifically, during a manufacturing process, the carbon fiber material is adjustably prestressed to optimize its conductivity for a selected application.

In accordance with another aspect of the present invention, higher resistance, electrically insulated heating wires are intermixed with the fiber.

In accordance with another aspect of the present invention, the thermal conductivity of the vessel is good, but lower than the thermal conductivity of the core material to promote rapid achievement of thermal equilibrium within the vessel.

In accordance with another aspect of the present invention, the vessel has relatively low electrical conductivity relative to the core material or is electrically insulated from the core. A means is provided for applying electrical current through the core material. In this manner, the core material functions as a resistive heating element during a heating portion of the thermal cycle.

In accordance with another more limited aspect of the present invention, the vessel includes walls of a high thermal conductivity ceramic material and a layer of a relatively low electrical conductivity metal along at least one surface of the chamber.

In accordance with another more limited aspect of the present invention, the vessel constrains expansion of the fill material except at a mechanical output region. At the mechanical output region, a thin metal is permitted to flex outward and inward, like a snap dome, to provide output mechanical movement.

In accordance with another more limited aspect of the present invention, a constrained resilient material is disposed between the snap dome and a push pin or piston assembly for converting expansion and contraction of the snap dome into sliding movement of the push pin or piston.

One advantage of the present invention resides in its speed of operation. The present design permits speeds which are comparable with a solenoid.

Another advantage of the present invention resides in its mechanical simplicity.

Another advantage of the actuators in accordance with the present invention resides in their high stiffness.

Other advantages include proportional control, high power densities, silent operation, safety, and flexibility of heat sources.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 2 is a longitudinal sectional view of the actuator of FIG. 1;

FIG. 3 is a transverse sectional view of the actuator of FIG. 1;

FIG. 6 is an alternate embodiment in which the core includes a spiral wrapped fabric of high thermal conductivity fiber;

FIG. 6A is an enlargement of a portion of FIG. 6;

DETAILED DESCRIPTION OF THE PREFERRED EMBODIMENTS

Figure 1:
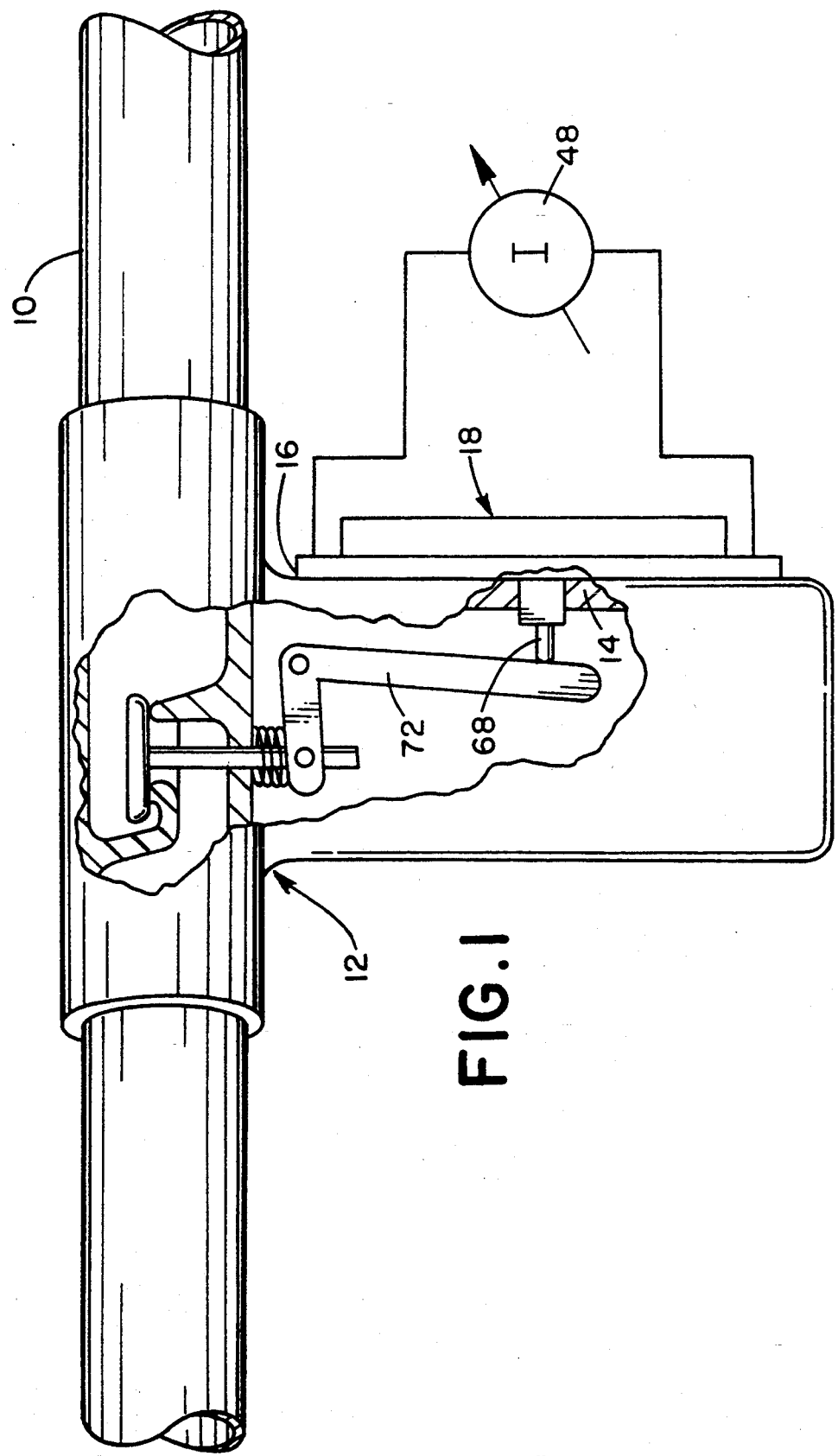
FIG. 1 is a diagrammatic illustration of an actuator in accordance with the present invention in combination with a fluid valve.

With reference to FIG. 1, a conduit 10 carries fluid, e.g. hydraulic fluid, to a control valve 12. Preferably, the fluid has a temperature below about or 65° F. Typically, hydraulic systems include a heat exchanger to keep hydraulic fluids cooled to temperatures below or 60° F. Numerous other fluid systems convey fluid which consistently has a temperature in this range, e.g. "cold" water systems, radiant heating systems, lower temperature chemical processing systems, and the like.

A first interface or heat sink member 14 provides thermal communication with the conveyed fluid. Preferably, the first heat sink or interface means includes a cylinder of aluminum, copper, or other highly thermal conductive material through which the fluid passes, e.g. part of the valve body. Preferably, the fluid directly contacts the first heat sink or interface member. Optionally, fins, or the like may be provided to improve heat transfer. On the other hand, the first heat sink or interface member may disposed around the circumference of the tubing 10, particularly if tubing 10 has good thermal conductivity. The first heat sink or interface member 14 defines a mounting area 16, preferably a flat face, for receiving an actuator 18.

Figure 4:
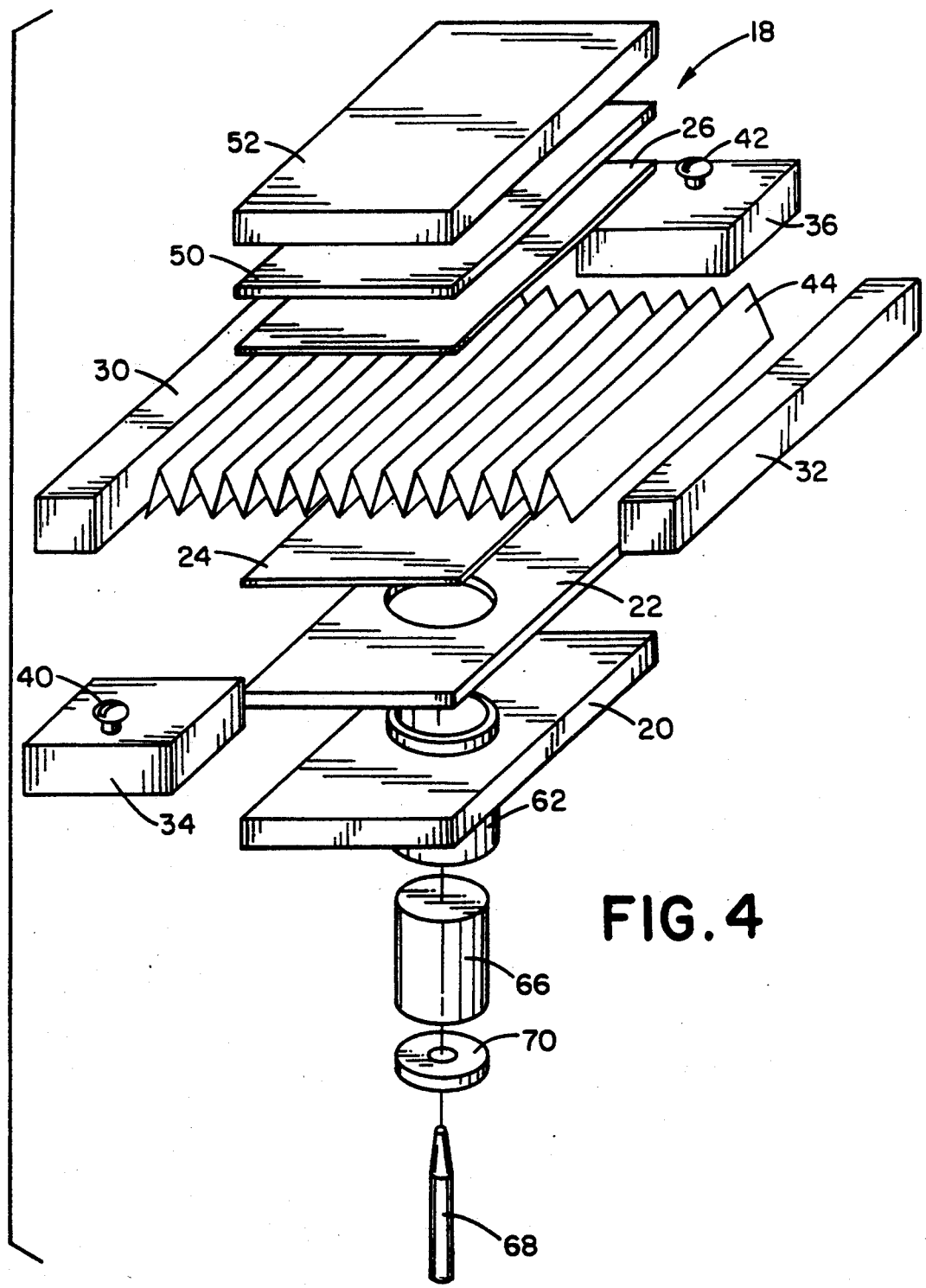
FIG. 4 is an exploded view of the actuator of FIG. 1.

With continuing reference to FIG. 1 and particular reference to FIGS. 2, 3, and 4, the actuator 18 includes a second or actuator heat sink 20 which is mounted against the mounting surface 16 of the first sink or interface member 14. A layer of a high thermal conductivity material 22 is connected in thermal communication with the second heat sink 20. Preferably, the high thermal conductivity layer 22 has a relatively low electrical conductivity to inhibit electrical current from flowing therethrough to the second heat sink 20. In the preferred embodiment, the layer 22 is a beryllium oxide ceramic.

Opposite layers of a metallic film or foil 24, 26, and edge members 30, 32, 34, 36 form a vessel which defines a chamber therein. The metallic film or foil layers 24, 26 are again constructed of a thermally conductive material with a relatively low electrical conductivity. Opposite longitudinal or side members 30, 32 are also constructed of a low electrical conductivity material.

Opposite end members 34, 36 are constructed of a material with good electrical conductivity, e.g. copper or beryllium copper. Electrical connection terminals 40, 42 are connected with the end members 34, 36, respectively. A core 44 of high thermal conductivity and good electrical conductivity is disposed in the chamber in electrical contact with end members 34, 36. The core member defines a multiplicity of thin passages, preferably less than 0.05 mm apart. The passages are filled with a thermal expansion material 46, such as wax, which expands as it undergoes a solid-solid phase change at its glass transition temperature, a solid-liquid phase change at its melting temperature, or the like. With thin passages 0.05 mm apart, all portions of the phase change material are less than 0.025 mm from the core member. This dimension may be decreased for a higher speed actuator or increased where lower speeds are acceptable.

In the embodiment of FIG. 4, the core member 44 is fabricated from 0.10 mm beryllium copper foil which is folded into a pleated section, e.g. by rolling between gear-like rollers. The foil is collapsed until the selected spacing, e.g. 0.05 mm, exists between adjacent walls of the core. The pleated core is brazed to the nichrome foils 24, 26, the nichrome side members 30, 32, and the copper or electrically conductive ends members 34, 36.

When an electrical current is applied between electrical connectors 40, 42, a voltage or current divider is effectively defined in which most of the current is channeled through the core foil 44. That is, a nichrome leg including nichrome foil 22, 26 and nichrome side members 30, 32 has a relatively high electrical resistance. A core leg including the core 44 and the end members 34, 36 has significantly less electrical resistance. With these two legs effectively connected in parallel, the current flows primarily through lower resistance leg in accordance with the relative resistance of the two legs. Although various other metals or compositions may be selected, their relative electrical resistance should cause sufficient current to move through the core to generate sufficient thermal energy to melt the expansion medium 46. Preferably, an adjustable current source 48 is provided to provide a large burst or pulse of current to cause initial actuation and to apply lower amounts of current to cause sufficient heating to offset cooling through the heat sinks to hold a preselected state of actuation of extension.

A second layer of the beryllium oxide or other thermally conductive material 50 is applied to an opposite face of the vessel. A reinforcing layer 52 overlays the second face to strengthen the chamber against buckling or expansion. The reinforcing member 52 may be selected primarily for its strength, e.g. steel, or may be selected for a combination of strength and thermal conductivity. The member 52 may act as a heat sink to the ambient atmosphere, or may be thermally connected with the first heat sink or interface means 14. For example, the actuator 18 may be mounted transversely to the orientation shown in FIG. 1 such that its top and bottom surfaces slide between oppositely disposed extensions of the first heat sink or interface member.

A mechanical movement transfer means 60 converts expansion of the expansion medium 46 into mechanical movement. In the preferred embodiment, the means 60 includes a cylindrical fitting 62 which is held firmly against one of the layers of nichrome foil 24, 26. The nichrome foil has a portion 64 which is purposely not brazed to the core 44 to enable it to flex outward from the chamber as the expansion material changes phase, i.e. to function as a snap dome member.

A deformable, resilient member 66, e.g. a rubber plug or core, is disposed in the cylindrical fitting 62 for transferring mechanical movement from the dome member 64 to a push pin 68. A threaded plug 70 is torqued down to compress the rubber core to preload the push pin 68. By selectively adjusting the torque on the rubber member, the starting dimension or extensional point of the push pin is calibrated. The rubber core 66 also functions analogous to a hydraulic fluid to transform the low travel, high area deflection of the dome member 64 into a higher travel, smaller cross-sectional area deflection of the push pin 68. Preferably, the push pin and threaded plug assemblies of different diameters can be inserted for adjusting between higher force, shorter travel actuations and lower force higher travel actuations. As yet another option, a push pin with a tapered cross section is used to provide multiple combinations of travel and force in different ranges of its own extension. The push pin 68 directly with a mechanical connection means 72 controls positioning of the valve 12.

Where appropriate, the first heat sink 14 and the housing of the valve 12 may be the same structure. The actuator 18 is then mounted on the exterior of the valve housing with the push pin 68 extending into the valve housing. Appropriate mechanical interconnections between the valve mechanism and the push pin are provided such that extension and contraction of the push pin opens and closes the valve 12.

Figure 5:
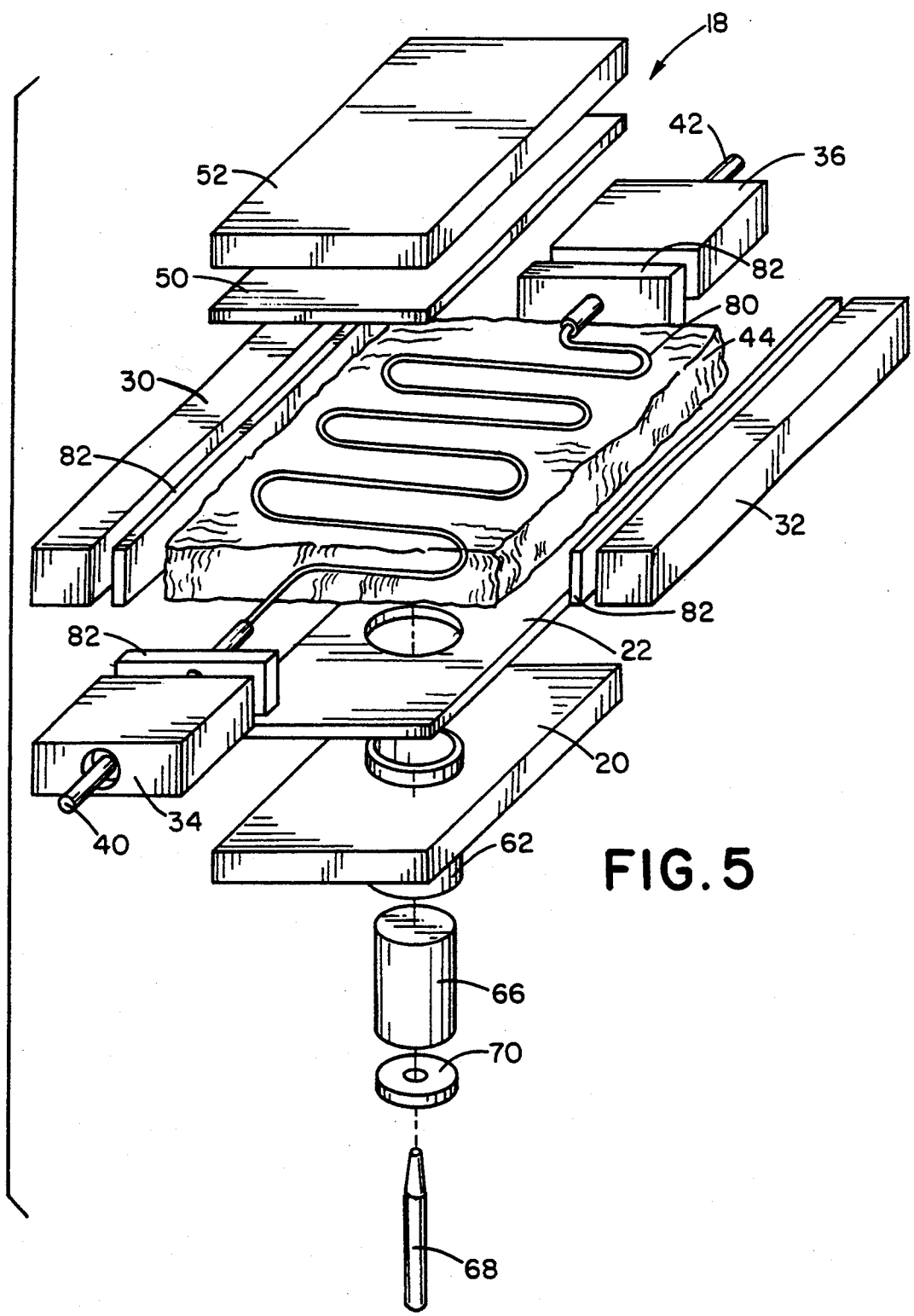
FIG. 5 is an exploded view of an alternate embodiment in which the core includes a fibrous mat.

With reference to FIG. 5, in another embodiment, the core 44 is a high thermal conductivity carbon fiber, preferably K-1100 carbon fiber, available from Amoco, which has a thermal conductivity about five times as high as beryllium copper. More specifically, the thermal conductivity of K-1100 carbon fiber is on the order of 640 btu/ft-°F.-Hr.

Carbon fiber or beryllium copper foil cores have relatively low electrical resistance, necessitating high amperage, low voltage power supplies. If low amperage, high voltage supplies are desired, a heater such as a resistance wire 80 can be included in the core. This wire is insulated from the core heat transfer materials. Alternately, a thin film of metal can be plated onto an insulating layer on either internal core surface and be in contact with the carbon fiber or beryllium copper core structures. This thin film, either applied by flame spray, sputtering, electrophoresis, or other means, is also electrically insulated at its contact with the core heat transfer structure. The carbon fibers readily conduct heat from the resistance wire to all regions of the thermally expansive material. Because the carbon fibers are highly electrically conductive, the resistance heating wire 80 is electrically insulated. Thermally conductive electrical insulators 82, such as beryllium oxide, prevent the carbon fiber from electrically shorting the terminals 40, 42. Ends of the electrical resistance wire are electrically interconnected with the high pressure electrical feedthroughs 40 and 42 to provide for selective heating in the vessel.

The fiber core may be a random fiber mat or felt which is impregnated with the thermally expansive medium, such as a thermally expansive polymer. Alternately, the carbon fibers may be woven into a cloth, fashioned into rovings, wound on a mandrel or put into other shapes or configurations. Further, the fibers may be randomly chopped. To facilitate manufacture, a soup of the melted thermally conductive material and finely divided carbon fibers may be mixed and loaded into the vessel. Further, other highly thermally conductive materials may also be introduced into the mix, such as diamonds. Industrial diamonds have a thermal conductivity which is about a third again more than the K-1100 carbon fiber. By intermixing an industrial diamond dust into the mixture, still better thermal conductivity can be provided. Alternately, the core can be comprised of finely divided diamonds alone without the carbon fibers. The industrial diamonds or diamond and fiber mixture are arranged in a random or other pattern which has a high surface area relative to the volume of thermally conductive material in the vessel, as discussed below.

FIG. 6 shows a preferred mandrel wound or coaxial carbon fiber, carbon filament embodiment. The vessel is defined by a highly thermally conductive metal member 100 which defines a generally annular bore therein. The bore has a tapered inner end 102 in which a tapered beryllium copper collet 104 is slidably received. An annular chamber 106 is defined between the collet and a rigid non-compressible metal element 110. The collet 104 has a lip 112 which restrains the metal element 110 from shifting rearward. An O-ring 114 inhibits high pressure leakage of the thermally conductive material and prevents air from being drawn into the annular region 106 as the thermally expansive material contracts.

The annular chamber 106 is filled with tightly mandrel wound carbon fibers 116 impregnated with the thermal expansion material. The fibers 116 are depicted as widely spaced in FIG. 6A for simplicity of illustration. A thin electrical resistive heater layer 118 extends substantially around the annular chamber and are surrounded by thermally conductive electrical insulation 120. Optionally, electrically insulated resistance wires may be disposed in the annular chamber 106. High pressure electrical feeds 122 provide insulated electrical current flow paths between the resistance heater layer 118 and the exterior of the actuator. A fill tube 124 is provided to facilitate filling of the annular bore 106 with the thermally expansive material.

A force transfer means transfers expansive force from the annular region 106. In the preferred embodiment, a plurality of radial bores 126 are filled with the polymeric expansion material 128. Under the high forces generated in the annular region 106, the polymeric expansion material flows to transfer the force even in its cool state. Optionally, other force transferring means may be disposed in all or part of the bores, such as a rubber or nylon plug.

The radial bores 126 merge such that the polymeric expansion material 128 acts against a piston 130 which is slidably received in a piston guide 132. An O-ring 134 and collar 136 are selectively clamped against the piston by threading the piston guide 132 into or out of the housing 100. In this manner, as the thermally expansive material changes phase and expands, it moves through the bores urging the piston to extend.

Figure 7:
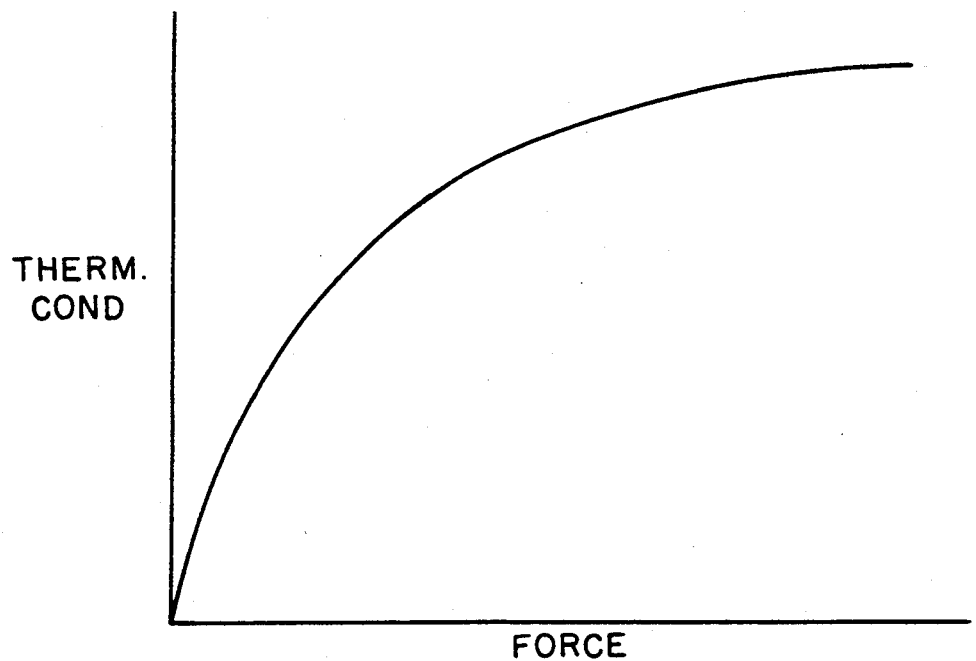
FIG. 7 plots thermal conductivity of the core of FIG. 6 versus the rest compressive force within the core; and, FIG. 8 is an inductively controlled alternate embodiment.

The collet 104 is threadedly connected 138 with the vessel 100. In this manner, rotation of the collet member 104 by engaging bores 140 forces the collet member 104 against the tapered wall surface 102. The camming contracts the diameter of the collet and compresses the carbon fiber and thermal expansion material within the annular chamber 106. With reference to FIG. 7, compressing the carbon fibers increases their electrical conductivity, hence their thermal conductivity. The improvement in thermal conductivity might be attributable to pressing crossing fibers together into better thermal contact. The collet includes collet flex points 142 and an O-ring 144 and hydraulic backup ring 146 to facilitate adjusting the compressive force with which the collet is forced into the bore. It is to be appreciated, that by selectively adjusting the threaded interaction of the collet and the housing, the conductivity of the carbon fiber can be adjusted to meet preselected conductivity parameters within the range of available conductivities of FIG. 7.

By adjusting the conductivity of the carbon fibers, the cooling rates of the core can be tailored. This allows the cooling to be tailored. The heat transfer conductivity of the carbon fiber and thermally expandable polymer can exceed the thermal conductivity of the housing when the housing is constructed of aluminum or beryllium copper. This higher thermal conductivity of the core relative to the housing promotes the cores coming into thermal equilibrium more rapidly than if the housing drained away the heat at the same speed as the core. As the housing removes heat, the more thermally conductive core reacts quickly to re-distribute the heat uniformly. This permits the core to heat and cool uniformly.

Figure 8:
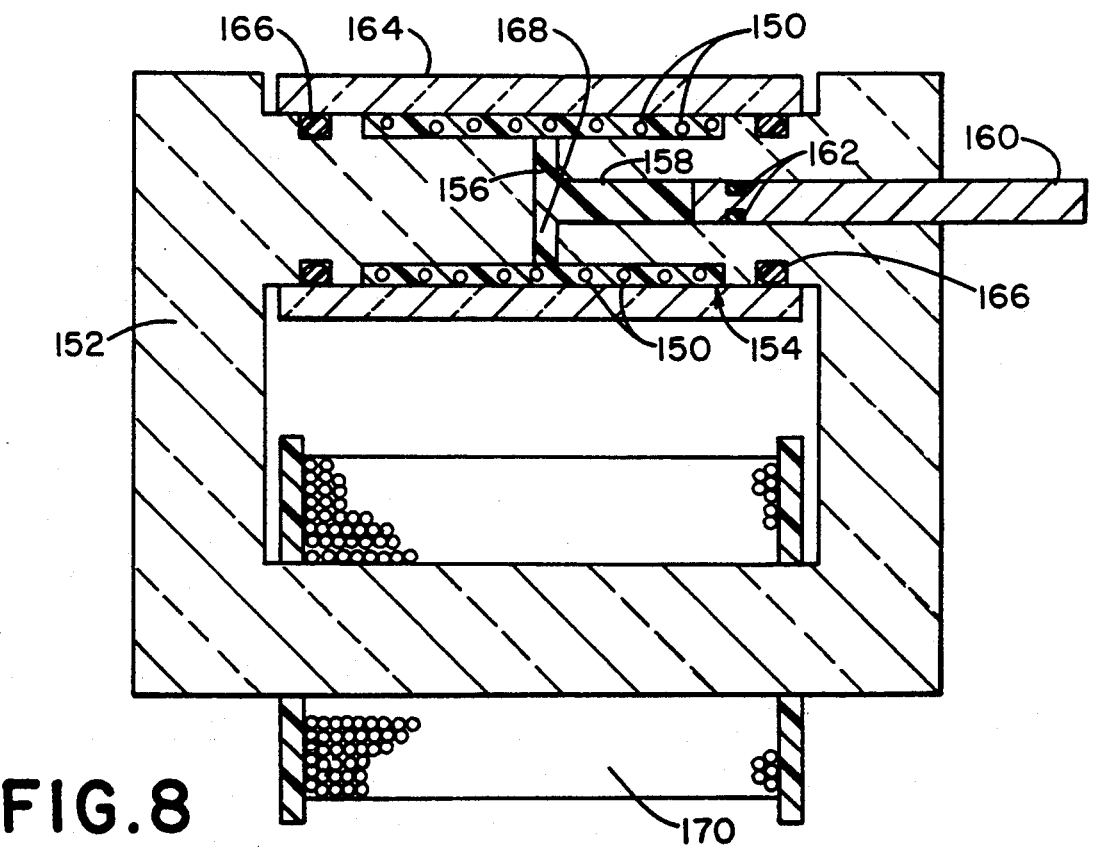

In the embodiment of FIG. 8, the actuator is inductively controlled. Electrically conductive carbon fibers 150 are wound tightly around a ceramic or iron magnetic flux conductive core 152 in a recessed region 154. The recessed region is connected by radial bores 156 to a central bore 158. A piston 160 with sealing O-rings 162 is slidably received in the central bore. A thermally conductive outer wall 164 closes the recess to define a closed annular chamber. The outer wall is preferably constructed of beryllium oxide ceramic to avoid parasitic induction of the magnetic field by the outer housing. O-rings 166 seal the annular chamber. The annular chamber including all voids among the tightly wound carbon filaments and the radial and central bores are filled with a polymeric expansion medium 168, such as wax. As the expansion medium in the annular chamber changes state and expands, the polymeric material in the radial and central bores is put under sufficient pressure that it flows, even without changing state. As the polymeric material flows, it forces the piston to extend. Alternately, bores 156, 158 can be filled with an elastomeric compound capable of transferring the expansion to the piston. In this embodiment, the expansion polymer is restricted to area 150.

The iron or ceramic magnetic core extends in a loop. A wire winding 170 is wrapped around a remote portion of the core loop for selectively generating magnetic flux through the loop. The magnetic flux induces currents in the electrical carbon fiber winding 150 causing resistance heating of the polymeric expansion material in the annular chamber. Optionally, resistance heating wires may be wound with the carbon fibers. The heating causes the polymeric material in the annular region to change state and expand, extending the piston. The dense winding of carbon fiber windings which all receive the same magnetic flux assure even heating. The primary winding 170 has the electrical characteristics of a solenoid, permitting existing solenoid control circuitry to be used. The rapid transfer of power into the secondary carbon fiber winding 150 provides rapid actuation speeds, comparable with a solenoid. Further, the high pressure electrical feedthroughs of the other embodiments are eliminated.

The speed of the actuator is, in large part, controlled by the speed with which thermal energy is moved into and out of the expansion medium. Because solenoids are among the most common actuators, a high proportion of existing equipment is designed to use actuators which operate at solenoid speeds. Analogously, many designers require actuators to have speeds comparable to solenoids Under load, solenoids typically operate in a range of about 50–500 milliseconds. Without load, solenoids might act as fast as 20 milliseconds. Accordingly, the core construction of the present actuator is designed to move heat into and out the expansion medium at a sufficient rate that actuation can be achieved in a half second or less The amount of heat energy $Q_c$ required to expand the actuator is determined by the heat of fusion $H_f$ of the expansion medium, the pressure P generated, and the expansion volume dV. The amount of heat energy $Q_c$ which must be removed to contract an expanded actuator is solely the heat of fusion $H_f$. The heat of fusion is a complex function of pressure and temperature which varies for different polymeric materials which is not readily reducible to a universal mathematical formula. For simplicity in the present analysis, the heat of fusion is represented as a fixed quantity Hr. More specifically:

Expanding: $Q_c = H_f + P*dV*c$      (1a)

Contracting: $Q_c = H_f$      (1b)

where c is a conversion factor which in the selected units is 1/9336 BTU per inch/pound. Typically, Q is measured in BTU per cubic inch, the heat of fusion $H_f$ is measured in BTU per cubic inch, the pressure P in pounds per square inch, and the expansion volume dV in cubic inches per cubic inch of expansion material volume. The heat transfer rate. q, is the time derivative of the heat energy Q, i.e.

Expanding: $q_c = dQ_c/dt = d(H_f + P*dV*c)/dt$      (2a)

Contracting: $q_c = dQ_c/dt = dH_f/dt$      (2b).

By way of specific example, for an actuation energy generating 100 PSI or 7 kg/sq. cm with 5% expansion in one half second, Equation (2) becomes:

$q_c = (H_f + ((100)(0.05)/9336))/0.5 = 2H_f + 0.00107$ BTU/second-cubic inch      (2c).

The core is configured with appropriate transfer parameters in order to achieve this heat transfer. In the heating or expansion mode, the applied electrical power can be increased to increase the actuation rate; however, in the cooling or contracting mode, the rate is controlled by the overall heat transfer coefficient. The overall heat transfer coefficient U describes the net thermal conductance of a total path between the heat sink and the expansion material. This path extends from the heat sink to furthest most incremental element of the expansion material which undergoes the phase change. It will be noted, that all phase change material need not undergo the phase change to affect contraction of the actuator. However, material which has not undergone the phase change does not contribute the actuation. Heat transfer rate $q_c$ is also defined by:

$$q_c = U A \Delta T \qquad (3)$$

where U is the overall heat transfer coefficient, A is the representative area of the conduction path, and $\Delta T$ is the overall temperature difference between the expansion material and the heat sink. In the present example, U it measured in BTU/degree F.*square inch; A in square, inches/cubic inch of expansion material; and $\Delta T$ in degree: F. Combining Equations (2) and (3):

Contracting: $UA = q_c/\Delta T = (dH_f/dt)/\Delta T \qquad (4a)$

Extending the above example to a situation in which the overall temperature difference $\Delta T$ is 10° F., the heat of fusion is 3.133 BTU/cubic inch, and the deactuation time is 0.5 sec.:

$$UA = 3.133/(0.5 \cdot 10) = 0.62666 \text{ BTU/cubic inch-sec.} - °F.$$

In the above calculations, U, the overall heat transfer rate is a conglomerate number which represents the thermal conductivity factors of the various materials in the path such as the nichrome foil, the beryllium oxide ceramic, the expanding polymer and the various sinks. In addition, it assumes a conglomerate geometry which can be represented by a theoretical area A, and a length factor, X, which is included in U. In order to amplify the geometry factor, we note that the thermal resistances of the various sink path materials are much lower than that of the expandable polymer. Typical thermal conductivities for sink materials are 140 to 640 BTU/(ft-sec-deg F.) as compared to a typical thermal conductivity for an expanding polymer of 0.5 BTU/(ft-sec-deg F.), or 240 to 1280 times more thermally conductive. Hence, we can approximate the problem by examining the polymer conductivity and geometry alone. In this case, the overall heat transfer coefficient, U, is replaced by the polymer heat transfer coefficient, $K_p$. The expandable polymer element which is farthest from the sink is defined as x inches through polymer away from the nearest core sink path element (carbon fiber or beryllium copper foil; recall that we are assuming the effect of the sink elements is small and ignoring that factor). Hence, we can rewrite Equation (3) as:

$$q_c = (KA/x)\Delta T \qquad (5),$$

where A is now an exact area of the conduction path which services the unitary volume of expanding polymer element under consideration. Knowing that K is a constant for the polymeric material, and fixing $\Delta T$ to a constant for this analysis, we have:

$$q_c = c^* A/x \qquad (6),$$

where $C = K^* \Delta T$.

We can now see that the speed of an actuator is increased by spreading a given volume of polymer in thinner layers (reducing x) over more sink surface area (increasing A). Our purpose is to define a universal actuator speed factor, and independent of the volume or physical size of any given actuator, hence we must normalize the $q_c$ in the Equation 6 above by dividing by the volume of the actuator, as follows:

$$q_c/v:(c^*A/x)/V = c/x^2 \qquad (7)$$

Since this is a factor for relative comparison of different systems, for convenience we can set c=1 and use the square root of the $1/x^2$ factor since it is maximized at the same points. We note that this factor is also equal to the internal surface area divided by the internal volume, which is convenient for many comparisons. Hence, our factor becomes:

$$R = A/V = 1/x \qquad (8),$$

or for a given volume of actuator, the speed is proportional to the reciprocal of the average distance from an interior wall. Taking a simple example of a narrow groove or saw cut that is x wide, y deep, and z long, the surface area is $2(x+y)z$ and the volume is xyz. The surface area to volume ratio, R, can be expressed:

$$R = \frac{2(x+y)z}{xyz} = 2\left(\frac{1}{x} + \frac{1}{y}\right). \qquad (9)$$

From experimental procedures, it has been found that saw cuts of 0.025 cm wide by 0.175 cm deep produce acceptable results. With this example $R = 571.4 \text{cm}^{-1}$. For fiber cores which have a diameter on the order of $10 \times 10.4$ cm, the surface to volume ratio is in the range of 35,00 to 127,500 cm$^{-1}$, depending on the density to which the fiber core is compressed. Accordingly, cores with a surface area to volume ratio over about 100 inches$^{-1}$ produce acceptable results at a lower speed with a ratio of 37,500 cm$^{-1}$ producing higher speed actuation.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An actuator comprising:
    a thermally conductive vessel which defines an interior chamber therein;
    a core disposed within and substantially filling the chamber, the core including:
        a mandrel,
        a high thermal conductivity matrix which defines a multiplicity of fine paths between surfaces thereof, the high thermal conductivity matrix extending around the mandrel and being thermally connected to the vessel for transferring heat to the vessel, the matrix including carbon fibers wrapped around the mandrel and substantially filling the interior chamber at least the carbon fibers having numerous points of contact for assuring thermal communication therebetween and defining a multiplicity of interstices thereamong, an electrical heating means disposed in the chamber in thermal communication with the high thermal conductivity matrix, the electrical heating means being electrically insulated from the high thermal conductivity matrix such that electrical current is prevented from flowing through the high thermal conductivity matrix to the vessel;

a phase change compound which expands as it changes from one non-gaseous phase to another non-gaseous phase, the phase change compound filling the paths within the high thermal conductivity matrix such that as the high thermal conductivity matrix and the electrical heating means conduct heat into the compound, the compound changes phase and expands and as the core conducts heat out of the compound, the compound changes phase and contracts;

a means mounted to the vessel in communication with the phase change compound for converting expansion and contraction of the phase change compound into mechanical movement.

2. The actuator as set forth in claim 1 wherein a ratio of an area of the surfaces of the thermally conductive matrix to a volume of the interior chamber of the vessel is greater than 250 centimeters$^{-1}$.

3. The actuator as set forth in claim 4 wherein the ratio is greater than 37,500 centimeters$^{-1}$.

4. The actuator as set forth in claim 1 wherein the electrical heating means includes electrical resistance wires wrapped around the mandrel.

5. The actuator as set forth in claim 1 wherein the vessel is in thermal communication with a conveyed liquid.

6. The actuator as set forth in claim 1 wherein the mechanical movement means includes:
an extending fitting which defines a bore in communication with the chamber;
a piston member movably supported in the fitting bore.

7. The actuator as set forth in claim 6 further including a resilient material disposed between the phase change compound in the chamber and the piston member.

8. The actuator as set forth in claim 7 further including a means for selectively compressing the resilient material for adjusting a set point of the piston member.

9. The actuator as set forth in claim 1 wherein the mechanical movement means operates a valve which controls liquid fluid flow and wherein the vessel is in thermal communication with a heat sink which heat sink is in thermal communication with the controlled fluid.

10. The actuator as set forth in claim 1 wherein the matrix includes material with a thermal conductivity of at least 600 BTU/foot-degree F-Hr.

11. The actuator as set forth in claim 1 wherein the interior chamber is generally annular and the mandrel is magnetic flux conductive and further including:

a primary winding for selectively inducing magnetic flux in the magnetic flux conductive mandrel and;
the core including a secondary winding disposed in the interior chamber such that the magnetic flux induced in the magnetic flux conductive mandrel induces a current in the secondary winding, the electric current in the secondary winding causing resistance heating.

12. The actuator as set forth in claim 11 wherein the secondary winding includes carbon fibers.

13. An actuator comprising:
a vessel which defines an interior chamber therein;
a thermally conductive fiber core disposed within the chamber defining a multiplicity of passages between surfaces of fiber thereof, the fiber core being compressed into the chamber such that the fiber are compressed into intimate physical and thermal contact with each other;
a heat sink thermally connected with the core for enhancing heat flow out of the core;
a phase change compound which expands as it changes from one non-gaseous phase to another non-gaseous phase, the phase change compound filling the passages within the core such that as the core conducts heat into the compound, it changes phase and expands and as the core conducts heat out of the compound increasing hydraulic pressure within the vessel, it changes phase and contracts decreasing hydraulic pressure within the vessel, the phase change compound having a heat transfer coefficient and a heat of fusion;
a means in communication with the phase change compound for changing the increases and decreases in hydraulic pressure into mechanical movement as the phase change compound expands and contracts;
a means for selectively creating temperature differentials $\Delta T$ between the heat sink and the core for moving heat out of the phase change compound; and
wherein the core has a representative area of a conduction path from the core into the phase change material such that $$\frac{UA\Delta T}{H_f} < 0.5 \text{ sec.}$$

where, U is the heat transfer coefficient of the phase change compound, $\Delta T$ is the temperature differential, A is the representative area of the conduction path from the core into the phase change compound and $H_f$ is a heat of fusion of the phase change compound.

14. The actuator as set forth in claim 13 wherein $$\frac{UA\Delta T}{H_f} \leq 50 \text{ msec.}$$

15. The actuator as set forth in claim 13 wherein the core contains an electrically insulated heating conductor.

16. An actuator comprising:
a thermally conductive vessel which defines an interior chamber therein;
a core disposed within and substantially filling the chamber, the core including:
a high thermal conductivity fiber matrix which defines a multiplicity of fine paths between surfaces thereof, the high thermal conductivity matrix being thermally connected to the vessel for transferring heat to the vessel, an electrical heater disposed in the chamber in thermal communication with the high thermal conductivity matrix the electrical heater being electrically insulted from the high thermal conductivity matrix such that electrical current is prevented from flowing through the high thermal conductivity matrix to the vessel, means for selectively compressing the thermally conductive fibers of the matrix;

a compound which expands when heated by the electrical heater the compound filling the paths within the high thermal conductivity matrix such that as the high thermal conductivity matrix and the electrical heater conduct heat into the compound, the compound expands and increases hydraulic pressure in the vessel and as the core conducts heat out of the compound, the compound contracts and reduces hydraulic pressure in the vessel:

a means mounted to the vessel in communication with the compound for converting expansion and contraction of the compound into mechanical movement.

17. The actuator as set forth in claim 16 wherein the thermally conductive material fiber includes carbon fiber.

18. The actuator as set forth in claim 17 wherein the carbon fiber is one of a random fiber mat, cloth, rovings, mandrel winding, randomly chopped, and finely divided.

19. An actuator comprising:
a vessel which defines an interior chamber therein;
a thermally conductive core disposed within the chamber defining a multiplicity of paths between surfaces thereof;
a phase change compound which expands as it changes from one non-gaseous phase to another non-gaseous phase, the phase change compound filling the paths within the core such that as the core conducts heat into the compound, it changes phase and expands and as the core conducts heat out of the compound, it changes phase and contracts;
a means for selectively reducing a volume of the interior chamber such that a volume of the paths through the thermally conductive core is reduced such that a ratio of core surface to compound volume is increased;
a means for converting expansion and contraction of the phase change compound into mechanical movement.

20. The actuator as set forth in claim 19 wherein the highly thermally conductive bore includes finely divided diamond.

21. A pressure device comprising:
a vessel which defines an interior chamber therein;
a thermally conductive porous core disposed within and substantially filling the chamber, the porous core including thermally conductive fibers which define a multiplicity of internal paths, the porous core being in thermal communication with a thermally conductive portion of the vessel, the fibers being compressed such that immediately contiguous surfaces of the fibers are pressed into intimate physical and thermal contact with each other;

a phase change compound which expands and contracts as it changes phase, the phase change compound filling the paths within the porous core such that as the porous core conducts heat into the phase change compound, the phase change compound expands and as the core conducts heat out of the phase change compound, the phase change compound contracts.

22. The device as set forth in claim 21 wherein the core includes:
carbon fibers having surfaces in direct thermal communication with the paths and electrically insulated resistance heating conductors extending through the porous core among the fibers in thermal communication therewith.

23. The device as set forth in claim 21 further including a means for converting expansion and contraction of the phase change compound into mechanical movement.

24. The device as set forth in claim 21 wherein there is a volume to surface area ratio between a volume of the interior chamber and a surface area of the carbon fiber, the volume to surface area ratio being at least 15,000 inches$^{-1}$.

25. The device as set forth in claim 21 further including:
a magnetic flux conductive member extending coaxial to the interior chamber, the carbon fiber core being at least partially disposed such that flux in the magnetic flux conductive member induces a resistance heating electric current in the carbon fiber;
a primary winding means for selectively inducing the magnetic flux in the magnetic flux conductive member.

26. The device as set forth in claim 21 further including:
a secondary winding disposed in the interior chamber;
a primary winding means for selectively inducing a magnetic flux such that the induced magnetic flux induces a heating current in the secondary winding.

27. A method of mechanical actuation comprising:
filling an internal chamber of a vessel with a thermally conductive core that defines a multiplicity of paths between surfaces thereof which paths are filled with a compound which expands and contracts as it changes phase, there being a volume to surface ratio between a volume of the internal chamber and an area of the core surface;
selectively adjusting the volume to surface ratio;
adding heat to the core causing the phase change compound to change phase and expand;
converting the expansion of the phase change compound to mechanical motion.

28. The method as set forth in claim 27 wherein adjusting of the volume to surface ratio includes contracting a volume of the internal chamber such that a compressive force on the core and the phase change compound is increased.

29. The method as set forth in claim 27 further including:
cooling the core to cause the phase change compound to contract.

30. The method as set forth in claim 27 wherein the step of adding heat includes:
inductively inducing a heating current in the internal chamber.

31. A pressure device comprising:

a vessel which defines an interior chamber therein;

a thermally conductive mandrel disposed centrally within the chamber;

a thermally conductive porous core disposed within and substantially filling the chamber, the thermally conductive porous core being wrapped around the mandrel and in thermal communication therewith, the porous core defining a multiplicity of internal paths therein, the porous core being in thermal communication with a thermally conductive portion of the vessel;

a compound which expands and contracts as heat is added and removed, the compound filling the paths within the porous core such that as the porous core conducts heat into the compound, the compound expands increasing hydraulic pressure in the vessel and as the core conducts heat out of the compound, the compound contracts decreasing hydraulic pressure in the vessel.

32. The device as set forth in claim 31 wherein the thermally conductive porous core includes woven carbon fiber which is wrapped around the mandrel such that the paths extend generally radially from the mandrel and generally perpendicular to the woven carbon fiber fabric.

33. A pressure device comprising:

a vessel which defines an interior chamber therein;

a porous, thermally conductive core disposed within the chamber and defining a multiplicity of paths between surfaces of the thermally conductive core, the thermally conductive core being in thermal communication with a thermally conductive portion of the vessel the core being constructed of closely packed carbon fibers with open interstices thereamong which define the paths a compound which expands and contracts as heat is added and removed the compound filling the paths within the thermally conductive core such that as the thermally conductive core conducts heat into the compound, the compound expands and as the thermally conductive core conducts heat out of the compound, the compound contracts; and a means for exerting compressive forces pressing immediately contiguous surfaces of the carbon fibers into intimate physical and thermal contact with each other, pressing the carbon fibers into intimate physical and thermal contact with the thermally conductive portion of the vessel, and decreasing a volume of the paths.

34. A pressure device comprising:

a thermally conductive vessel which defines an interior chamber therein;

a thermally conductive mandrel disposed within the interior chamber such that the interior chamber has a generally toroidal volume;

a core including carbon fibers and insulated electrical resistance heating wires wrapped around the mandrel and substantially filling the interior chamber, at least the carbon fibers having numerous points of contact for assuring thermal communication therebetween and defining a multiplicity of open interstices thereamong;

a compound filling the interstices among the carbon fibers of the core, the compound expanding as the carbon fibers and electrical resistance wires introduce heat into the compound increasing hydraulic pressure within the vessel and the compound contracting as the carbon fibers conduct heat out of the compound to the vessel and mandrel decreasing hydraulic pressure within the vessel.

35. The device as set forth in claim 34 further including a means mounted to the vessel for converting increases and decreases in hydraulic pressure within the vessel into mechanical movement.

36. The device as set forth in claim 34 wherein the compound has a heat transfer coefficient U which is indicative of a rate at which heat is transferred through the compound to and from the carbon fibers and a heat of fusion $H_f$ which is indicative of an amount of heat required for the compound to change between a flowable first phase and a second phase, the interstices among the carbon fibers being sufficiently small relative to a surface area of the carbon fibers that a representative area of a conduction path from the carbon fibers into the compound for a given temperature differential $\Delta T$ between the carbon fibers and the vessel and mandrel satisfy the conditions that $$\frac{UA\Delta T}{H_f} < 0.5 \text{ sec.}$$

such that the device has an actuation speed of less than a half second.

* * * * *